US007046777B2

(12) United States Patent
Colson et al.

(10) Patent No.: US 7,046,777 B2
(45) Date of Patent: May 16, 2006

(54) IVR CUSTOMER ADDRESS ACQUISITION METHOD

(75) Inventors: Vicki L. Colson, Tavernier, FL (US); Brent L. Davis, Deerfield Beach, FL (US); Baiju D. Mandalia, Boca Raton, FL (US); Vanessa V. Michelini, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 10/452,359

(22) Filed: Jun. 2, 2003

(65) Prior Publication Data

US 2004/0240639 A1 Dec. 2, 2004

(51) Int. Cl.
*H04M 1/56* (2006.01)

(52) U.S. Cl. ............................ 379/142.06; 374/218.01
(58) Field of Classification Search ........... 379/201.01, 379/88.18, 222.14, 207.12, 218.01, 201.08, 379/142.06, 142.01
See application file for complete search history.

(56) References Cited

U.S. PATENT DOCUMENTS

| | | | | |
|---|---|---|---|---|
| 4,954,958 | A | * | 9/1990 | Savage et al. .............. 701/202 |
| 5,325,421 | A | * | 6/1994 | Hou et al. ................ 379/88.03 |
| 5,675,637 | A | * | 10/1997 | Szlam et al. ........... 379/142.17 |
| 5,719,921 | A | | 2/1998 | Vysotsky et al. |
| 5,832,063 | A | | 11/1998 | Vysotsky et al. |
| 6,065,016 | A | | 5/2000 | Stuntebeck et al. |
| 6,122,614 | A | | 9/2000 | Kahn et al. |
| 6,229,880 | B1 | | 5/2001 | Reformato et al. |
| 6,459,782 | B1 | * | 10/2002 | Bedrosian et al. ...... 379/201.08 |
| 6,778,647 | B1 | * | 8/2004 | Dumas ..................... 379/93.12 |
| 2002/0126814 | A1 | * | 9/2002 | Awada et al. .......... 379/142.01 |
| 2002/0136381 | A1 | * | 9/2002 | Shaffer et al. ......... 379/201.02 |
| 2003/0068022 | A1 | * | 4/2003 | Katz ....................... 379/92.01 |
| 2003/0174823 | A1 | * | 9/2003 | Justice et al. ................ 379/145 |
| 2004/0008834 | A1 | * | 1/2004 | Bookstaff .............. 379/218.01 |
| 2004/0146150 | A1 | * | 7/2004 | Barnes .................. 379/142.15 |
| 2004/0258234 | A1 | * | 12/2004 | Stillman et al. ........ 379/218.01 |

OTHER PUBLICATIONS

"Using Spoken Telephone Numbers to Reduce Perplexity in Data Input", IBM Tech. Disclosure Bulleting, vol. 38, No. 5, May 1995.

* cited by examiner

*Primary Examiner*—Ovidio Escalante
*Assistant Examiner*—Olisa Anwah
(74) *Attorney, Agent, or Firm*—Akerman Senterfitt

(57) ABSTRACT

A method of automatically acquiring and/or updating a customer address within an interactive voice response system including establishing a telephony connection with a customer and identifying a telephone number associated with the customer. A directory assistance data store external to the interactive voice response system can be accessed. A reverse directory search based upon the telephone number can be performed to retrieve an address from the directory assistance data store. The retrieved address can be stored within an interactive voice response system data store.

22 Claims, 2 Drawing Sheets

IVR CUSTOMER ADDRESS ACQUISITION METHOD

BACKGROUND OF THE INVENTION

1. Technical Field

The present invention relates to the field of automated systems and, more particularly, to interactive voice response systems.

2. Description of the Related Art

The cost of manned customer service centers has resulted in numerous companies utilizing automated interactive voice response (IVR) systems in place of or as a supplement to human agents. The IVR systems can perform customer service tasks, such as updating customer information. One routinely stored item of customer information is the customer's address. The customer's address can be necessary in order to ship purchased goods and to send postal mail messages, such as sale events and bills, to the customer.

Unfortunately, acquiring a customer address can be a difficult task for conventional IVR systems, which typically receive touch-tone keypad input and speech input. Notably, keypad input is an impractical manner for inputting customer address information due to the quantity of numbers and letters contained within an address. Therefore, IVR systems generally attempt to acquire customer address information from speech input using voice recognition technology.

Use of speech recognition for receiving address information, however, can be problematic. Problems with converting spoken addresses into text relate to unique characteristics of addresses. Specifically, addresses can be syntactically complex structures containing many different elements, such as cities, states, street names, digits, and the like. Accordingly, a speech recognition engine supporting address conversion requires a large recognition grammar in order to convert these different elements. Even so, the speech recognition engine can produce results for spoken addresses that contain many inaccuracies.

Speech recognition applications generally rely on the grammatical context of a speech input and on ordinary pronunciation rules to achieve accurate results. These two techniques are difficult to apply when converting spoken addresses to text. Many elements within an address, such as street name, are a hodgepodge of words having no significant grammatical context that can be used by speech recognition engines to differentiate among possible conversion alternatives. Further, speech recognition applications, which rely on ordinary pronunciation rules, often have difficulty converting proper nouns, which can contain a disproportionately large number of nonstandard pronunciation variations when compared to other words within a language. Of course, addresses can include many proper nouns, such as city and street names, that contain pronunciation exceptions. Accordingly, speech recognition accuracy for converting spoken addresses to text is generally low. As such, updating address information in computing systems has largely remained a manual process.

SUMMARY OF THE INVENTION

The invention disclosed herein provides a method, a system, and an apparatus for acquiring and updating customer addresses using an interactive voice response (IVR) system. More specifically, a customer can establish a telephony connection with the IVR system. The IVR system can then obtain a telephone number from the customer. The IVR system can access an external directory assistance data store and perform a reverse directory search for an address corresponding to the received telephone number. If an address is found, the customer can be asked to confirm the accuracy of the address. If the address is confirmed, the IVR system can store the address as the customer's address within a data store associated with the IVR system.

One aspect of the present invention can include a method of automatically acquiring a customer address within an IVR system including establishing a telephony connection with a customer and identifying a telephone number associated with the customer. In one embodiment, the telephone number can be identified by prompting the customer for the telephone number, receiving a speech input response, and performing a voice recognition function upon the speech input response. In another embodiment, the telephone number can be identified by prompting the customer for the telephone number and receiving a keypad response. In yet another embodiment, the telephone number can be identified by determining the telephone number from caller identification information of the telephony connection, prompting the customer to verify the telephone number, and receiving a verification response. Whenever the customer is prompted for a telephone number, the customer can be specifically asked to provide their home phone number and/or a work phone number.

Additionally, a directory assistance data store external to the IVR system can be accessed. A reverse directory search based upon the telephone number can be performed to retrieve an address from the directory assistance data store. A determination can be made as to whether the reverse directory search finds an entry associated with the telephone number. If the entry is not found, an alternate means for acquiring the customer address can be provided. The customer can be prompted to confirm the retrieved address. For example, an audible prompt including the retrieved address can be presented to the customer. An address confirmation response can be received in response to the confirmation request. If the address confirmation response is a negative response, an alternate means for acquiring the customer address can be provided. The retrieved address can be stored within an IVR system data store. If the customer address is acquired to update a preexisting customer address, the preexisting customer address can be overwritten within the IVR system data store by the retrieved address. Further, the IVR system data store can include business data for institutions served by the IVR system.

Another aspect of the present invention can include a system of automatically acquiring a customer address within an IVR system. The system can include a means for establishing a telephony connection with a customer and a means for identifying a telephone number associated with the customer. The system can also include a means for accessing a directory assistance data store external to the IVR system. Additionally, a means can be provided for performing a reverse directory search based upon the telephone number. The system can further include a means for storing a retrieved address within an IVR system data store.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method, a system, and an apparatus for acquiring and updating a customer address using an interactive voice response (IVR) system. More particularly, a reverse directory search can be performed upon a directory assistance data store, which is external to the IVR system, to acquire an associated address. The search can utilize a telephone number obtained from an IVR customer. The address returned by the search can be stored by the IVR system within an internal data store.

Figure 1:
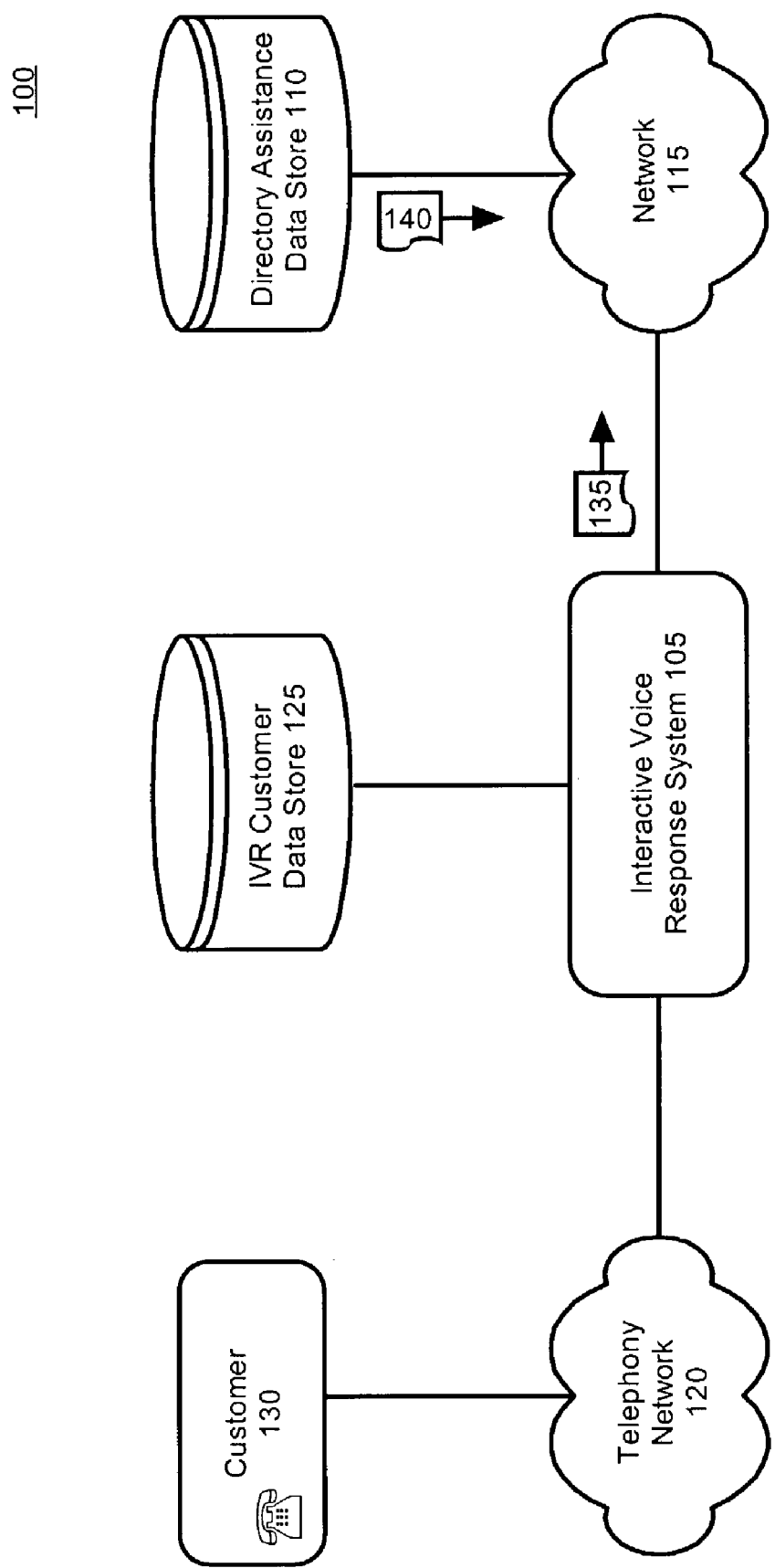
FIG. 1 is a schematic diagram illustrating an exemplary system for acquiring customer addresses using an interactive voice response system in accordance with the inventive arrangements disclosed herein.

FIG. 1 is a schematic diagram illustrating an exemplary system 100 for acquiring customer addresses using an IVR system in accordance with the inventive arrangements disclosed herein. The system 100 can include an IVR system 105, a directory assistance data store 110, and an IVR customer data store 125. The IVR system 105 can be an automated customer support system capable of acquiring a customer address and/or updating a preexisting customer address. The IVR system 105 can accept a combination of voice telephone input and touch-tone keypad selections. The IVR system 105 can then process received inputs and provide appropriate responses. Appropriate responses of the IVR system 105 are not limited to voice responses but can include other forms of response, such as fax responses, callback responses, email responses, and the like.

The directory assistance data store 110 can be an information repository that includes multiple telephone number entries and addresses that correspond to each of the telephone numbers. The directory assistance data store 110 can permit reverse directory searches to be performed based upon both business and residential telephone numbers. Advantageously, the directory assistance data store 110 can be automatically updated and maintained by a source external to the IVR system 105. A variety of directory assistance providers exist, many of which are Web based directory assistance providers, which can provide the directory assistance data store 110 described herein. For example, Switchboard.com from Switchboard, Inc. of Westboro, Mass. and Whitepages.com from W3 Data, Inc of Seattle, Wash. are two publicly available directory assistance providers that permit reverse directory searches. Other directory assistance providers and/or externally maintained directory assistance data stores 110 are also available, some of which are not generally available to the public without the payment of a periodic subscription fee.

The IVR customer data store 125 can be any data repository communicatively linked to the IVR system 105. The IVR customer data store 125 can include multiple data entries including at least one customer address entry for customers of the IVR system 105. For example, the IVR customer data store 125 can include business data for multiple institutions served by the IVR system 105. The IVR system 105 can search, add, and update the customer address entry of the IVR customer data store 125.

In operation, a customer 130 can establish a telephony connection via a telephony network 120 with the IVR system 105. The IVR system 105 can then establish the identity of the customer 130. At some point during the communication session involving the customer 130 and the IVR system 105, a need for the IVR system 105 to acquire a customer address can arise. In response, the IVR system 105 can obtain a customer telephone number 135. In one embodiment, the telephone number 135 can be obtained automatically using telephony connection information, such as caller ID. In another embodiment, the telephone number 135 can be obtained automatically from previously stored customer records that can be uniquely accessed whenever the customer 130 logs into the IVR system 105. In yet another embodiment, the telephone number 135 can be obtained directly from the customer 130 responsive to prompting actions.

At this point, the IVR system 105 can access the directory assistance data store 110 via a network 115 in order to perform a reverse directory search. An address 140 associated with the telephone number 135 can result from the search. Thereafter, the IVR system 105 can prompt the customer 130 for confirmation that the received address 140 is correct. If the customer 130 provides an affirmative confirmation response, the address 140 can be stored within the IVR customer data store 125.

It should be noted that in one embodiment, the IVR system 105 can automatically determine whether a customer address needs updated. In such an embodiment, the customer's telephone number 135 can be automatically determined as previously mentioned. The telephone number 135 can be used to obtain the received address 140 from the directory assistance data store 110. The received address 140 can then be automatically compared to a preexisting address associated with the customer 130 stored in the IVR customer data store 125. If the addresses are different, the customer 130 can be prompted to update the preexisting address. For example, the customer 130 can be presented with a message asking if the preexisting address should be updated to the retrieved address. On an affirmative response, the preexisting address can be overwritten with the retrieved address 140.

Figure 2:
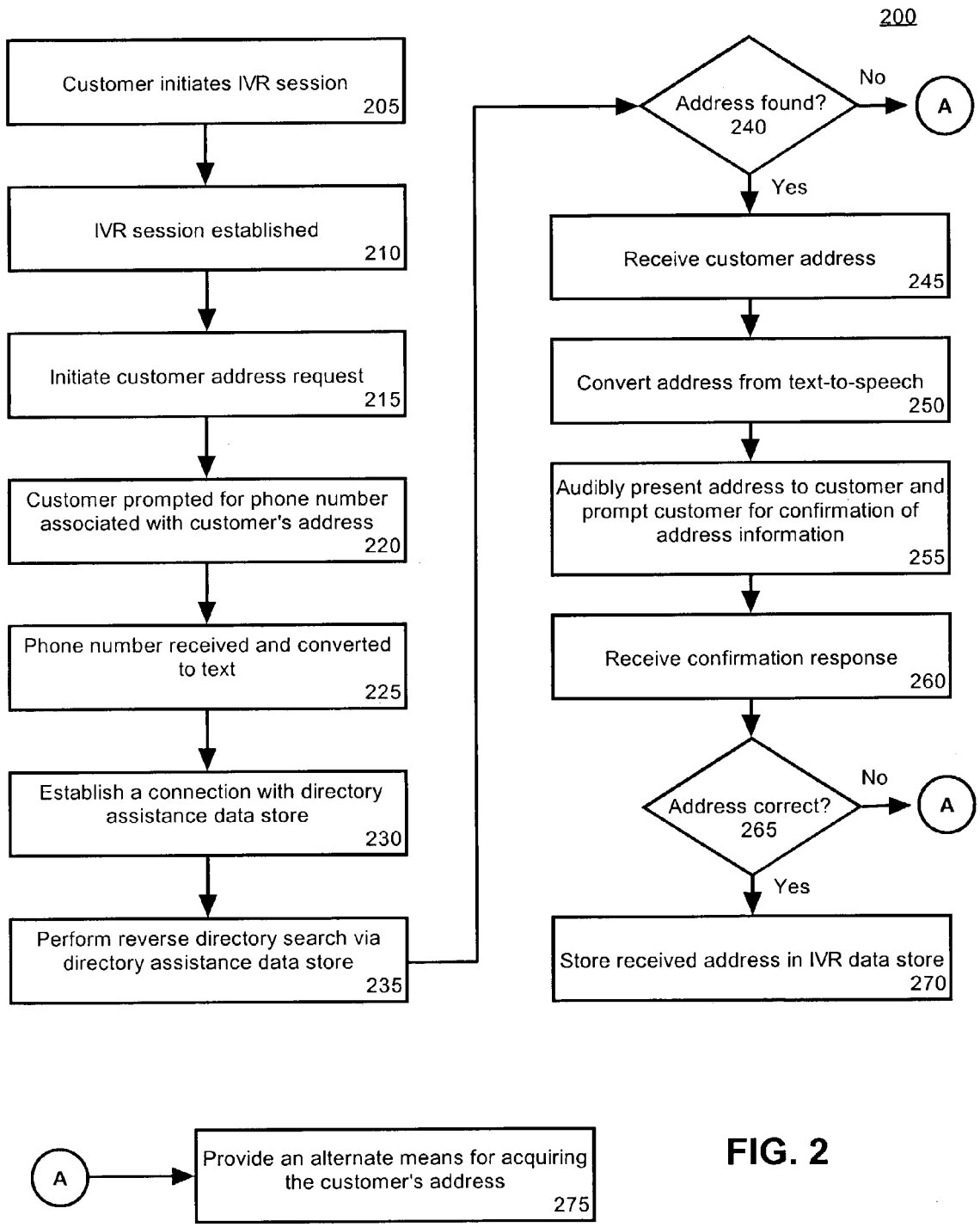
FIG. 2 is a flow chart illustrating a method of acquiring customer addresses using an interactive voice response system in accordance with the inventive arrangements disclosed herein.

FIG. 2 is a flow chart illustrating a method 200 of automatically acquiring customer addresses in accordance with the inventive arrangements disclosed herein. The method 200 can be performed in the context of an IVR system that stores customer specific information including a customer address. The method can begin in step 205 when a customer initiates an IVR session by calling the IVR system. In step 210, an IVR session can be established with the customer that can require customer identification. Accordingly, the customer can provide a customer identification and/or password and log onto the IVR system. Alternatively, the customer identify can be automatically determined by the IVR system using telephony connection information, such as caller ID.

In step 215, a customer address request can be initiated. In step 220, a customer can be prompted for a telephone number. This prompt can further request that the customer provide a number associated with an address that the customer wishes the IVR system to utilize. The requested phone number can be the customer's home phone number, customer's work phone number, or some other number. The telephone number can either be provided by entering a keypad response and/or by speaking the telephone number. In an alternative embodiment, the telephone number can be automatically obtained using caller identification information. When so obtained, the customer can be prompted to confirm that the currently used telephone is associated with a desired customer address. If not, the customer can be prompted for a different telephone number, such as a home telephone number. In step 225, the customer's input, whether it is a speech input or a DTMF (dual tone multi frequency) signal, can be converted into text. In step 230, a connection can be established with a directory assistance data store, which can be an information repository containing directory information that is updated and maintained by a directory assistance provider. The IVR system can then query the directory assistance provider for an address using the phone number provided by the customer.

In step 235, a reverse directory search based on the telephone number can be performed. In step 240 if no address is found, the method can proceed to step 275 where an alternate means for acquiring the customer's address can be provided. For example, the customer can be transferred to a customer service agent. Alternatively, the customer can be asked to provide an alternative telephone number associated with the same address.

If an address is found in step 240, the method can proceed to step 245 where the address can be conveyed from the directory assistance data store to the IVR system. In step 250, a text-to-speech action can be performed upon the received address. In step 255, the received address can be audibly presented to the customer and the customer can be prompted to confirm the accuracy of the received address. In step 260, an address confirmation response can be received from the user. This confirmation response can be a DTMF signal and/or a speech input. In step 265, if the confirmation response indicates that the address is incorrect, the method can proceed to step 275 where an alternate means for acquiring the customer's address can be provided. If the confirmation response of step 265 indicates the address is correct, then the received address can be stored in a customer information data store used by the IVR system. Once the customer's address has been stored, method 200 ends and further customer/IVR interactions can occur.

It should be appreciated by one of ordinary skill in the art that the method described herein is not limited to updating postal addresses. Other addresses, such as email addresses and/or computer network identification addresses can also be acquired and/or updated using the method taught herein. Further, the disclosed method can be applied to acquire and/or update data within a local data store from a variety of external sources so long as the external source information can be uniquely referenced using a telephone number. Consequently, the disclosed method can be used generally by businesses to update personal invention of customers and/or employees via centralized authenticated sources.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of acquiring a customer address within an interactive voice response system comprising the steps of:

establishing a telephony connection between a customer and an interactive voice response system that provides automated customer support to customers of an entity that maintains and operates the interactive voice response system;

identifying a telephone number associated with said customer;

querying a directory assistance data store external to said interactive voice response system for an address of said customer based upon said telephone number wherein the directory assistance data store comprises an information repository that includes multiple telephone number entries and addresses that correspond to each of the telephone number entries, wherein information within the directory assistance data store is automatically updated and maintained by a directory assistance provider, and wherein the directory assistance provider is a source different from the entity that maintains and operates the interactive voice response system;

retrieving an address of said customer from said directory assistance data store by performing a reverse directory search utilizing a telephone number obtained by the interactive voice response system;

comparing said retrieved address of said customer with a previously stored address associated with the customer within an interactive voice response customer data store accessible by the interactive voice response system, wherein the interactive voice response customer data store includes data for entities served by the interactive voice response system, and wherein the interactive voice response system can search, add, and update entries within the interactive voice response customer data store that are associated with said customer; and, the interactive voice response system automatically storing said retrieved address within an entry of the interactive voice response customer data store associated with said customer in place of the previously stored address.

2. The method of claim 1, said identifying step further comprising the steps of:

prompting said customer for said obtained telephone number;

receiving a speech input response specifying said obtained telephone number; and, converting said speech input response to a textual response, wherein the prompting, receiving, and converting steps are performed by the interactive voice response system.

3. The method of claim 1, said identifying step further comprising the steps of:

prompting said customer for said obtained telephone number; and, receiving a keypad response specifying said obtained telephone number, wherein the prompting and receiving steps are performed by the interactive voice response system.

4. The method of claim 1, said identifying step further comprising the step of:
the interactive voice response system automatically determining said identified telephone number from caller identification information of said telephony connection.

5. The method of claim 1, said identifying step further comprising the step of:
the interactive voice response system prompting said customer for at least one of a home phone number and a work phone number.

6. The method of claim 1, further comprising the steps of:
prompting said customer to confirm said retrieved address; and,
receiving an address confirmation response so that said storing step is automatically performed responsive to said confirmation response.

7. The method of claim 6, wherein said prompting step comprises:
converting said retrieved address to speech to audibly prompt said customer.

8. The method of claim 1, further comprising the steps of:
automatically determining said telephone number based upon caller identification information; and
if said retrieved customer address is different from said previously stored customer address, prompting said customer to update said previously stored customer address.

9. The method of claim 1, wherein said data store includes business data for a plurality of institutions served by said interactive voice response system.

10. A machine-readable storage having stored thereon, a computer program having a plurality of code sections, said code sections executable by a machine for causing the machine to perform the steps of:
establishing a telephony connection between a customer and an interactive voice response system that provides automated customer support to customers of an entity that maintains and operates the interactive voice response system;
identifying a telephone number associated with said customer;
querying a directory assistance data store external to said interactive voice response system for an address of said customer based upon said telephone number wherein the directory assistance data store comprises an information repository that includes multiple telephone number entries and addresses that correspond to each of the telephone number entries, wherein information within the directory assistance data store is automatically updated and maintained by a directory assistance provider, and wherein the directory assistance provider is a source different from the entity that maintains and operates the interactive voice response system;
retrieving an address of said customer from said directory assistance data store by performing a reverse directory search utilizing a telephone number obtained by the interactive voice response system;
comparing said retrieved address of said customer with a previously stored address associated with the customer within an interactive voice response customer data store accessible by the interactive voice response system, wherein the interactive voice response customer data store includes data for entities served by the interactive voice response system, and wherein the interactive voice response system can search, add, and update entries within the interactive voice response customer data store that are associated with said customer; and,
the interactive voice response system automatically storing said retrieved address within an entry of the interactive voice response customer data store associated with said customer in place of the previously stored address.

11. The machine-readable storage of claim 10, said identifying step further comprising the steps of:
prompting said customer for said obtained telephone number;
receiving a speech input response specifying said telephone number; and,
converting said speech input response to a textual response, wherein the prompting, receiving, and converting steps are performed by the interactive voice response system.

12. The machine-readable storage of claim 10, said identifying step further comprising the steps of:
prompting said customer for said obtained telephone number; and,
receiving a keypad response specifying said telephone number, wherein the prompting and receiving steps are performed by the interactive voice response system.

13. The machine-readable storage of claim 10, said identifying step further comprising the step of:
the interactive voice response system automatically determining said identified telephone number from caller identification information of said telephony connection.

14. The machine-readable storage of claim 10, said identifying step further comprising the step of:
the interactive voice response system prompting said customer for at least one of a home phone number and a work phone number.

15. The machine-readable storage of claim 10, further comprising the steps of:
prompting said customer to confirm said retrieved address; and,
receiving an address confirmation response so that said storing step is automatically performed responsive to said confirmation response.

16. The machine-readable storage of claim 15, wherein said prompting step comprises:
converting said retrieved address to speech to audibly prompt said customer.

17. The machine-readable storage of claim 10, further comprising the steps of:
automatically determining said identified telephone number based upon at least one of previously stored customer data and caller identification information;
if said retrieved customer address is different from said previously stored customer address, prompting said customer to update said previously stored customer address.

18. The machine-readable storage of claim 10, wherein said data store includes business data for a plurality of institutions served by said interactive voice response system.

19. A method of updating customer address information within a persistent data store comprising the steps of:
an interactive voice response system identifying a customer and a telephone number associated with the customer during a communications session, the interactive voice response system providing automated customer support to customers of an entity that maintains and operates the interactive voice response system;

the interactive voice response system querying a directory assistance data store for an address of the customer based upon said telephone number, wherein the directory assistance data store comprises an information repository that includes multiple telephone number entries and addresses that correspond to each of the telephone number entries, wherein information within the directory assistance data store is automatically updated and maintained by a directory assistance provider, and wherein the directory assistance provider is a source different from the entity that maintains and operates the interactive voice response system;

retrieving an address associated with the customer from said directory assistance data store responsive to said querying step by performing a reverse directory search utilizing a telephone number obtained by the interactive voice response system;

determining that a previously stored address associated with the customer is incorrect by comparing the previously stored address with the retrieved address; and the interactive voice response system automatically replacing said previously stored address with said retrieved address, said previously stored address and said retrieved address being entries within an interactive voice response customer data store associated with the interactive voice response system within which the interactive voice response system can search, add, and update entries.

20. The method of claim 19, further comprising the steps of:

using the interactive voice response system to prompt a caller for obtained said telephone number.

21. A machine-readable storage having stored thereon, a computer program having a plurality of code sections, said code sections executable by a machine for causing the machine to perform the steps of:

an interactive voice response system identifying a customer and a telephone number associated with the customer during a communications session, the interactive voice response system providing automated customer support to customers of an entity that maintains and operates the interactive voice response system;

the interactive voice response system querying a directory assistance data store for an address of the customer based upon said telephone number, wherein the directory assistance data store comprises an information repository that includes multiple telephone number entries and addresses that correspond to each of the telephone number entries, wherein information within the directory assistance data store is automatically updated and maintained by a directory assistance provider, and wherein the directory assistance provider is a source different from the entity that maintains and operates the interactive voice response system;

retrieving an address associated with the customer from said directory assistance data store responsive to said querying step by performing a reverse directory search utilizing a telephone number obtained by the interactive voice response system;

determining that a previously stored address associated with the customer is incorrect by comparing the previously stored address with the retrieved address; and the interactive voice response system automatically replacing said previously stored address with said retrieved address, said previously stored address and said retrieved address being entries within an interactive voice response customer data store associated with the interactive voice response system within which the interactive voice response system can search, add, and update entries.

22. The machine-readable storage of claim 21, further comprising the steps of:

using the interactive voice response system to prompt a caller for said obtained telephone number.

* * * * *